United States Patent Office 3,518,047
Patented June 30, 1970

3,518,047
METHOD FOR RETARDING WATER EVAPORATION
Richard W. Alsgaard, Midland, Mich., assignor to Dow Corning Corporation, Midland, Mich., a corporation of Michigan
No Drawing. Filed Aug. 15, 1968, Ser. No. 752,791
Int. Cl. B01j 1/18
U.S. Cl. 21—60.5                                         51 Claims

ABSTRACT OF THE DISCLOSURE

A process for retarding water evaporation in which an aqueous surface is treated with an organosilicon compound. An example of the organosilicon compound is $C_{18}H_{37}SiH_3$.

---

The present invention relates to a process for retarding evaporation from aqueous surfaces and to an aqueous body in which the surface carries an evaporation retarder.

The conservation of water is very important throughout the world. The increasing population and industry have created an urgent need for conserving as much water as possible. In hot and dry climates large amounts of water are lost through evaporation. One such area is the southwestern section of the United States of America. Large sums of money have been and are now being spent to satisfy the water needs. One method being diligently investigated is the desalination of ocean water to provide additional fresh water to meet the growing demands. Desalination is a very expensive means of obtaining fresh water when compared to the natural sources of fresh water. After going through the expensive desalination process for obtaining fresh water, much of the water is lost to evaporation which adds to the total cost of the water as well as to cause the requirements for fresh water to increase.

One solution to this problem was to find a way to retard the evaporation of the water and thus save the water already available and obtain as much utility from as little water as possible. One means of retarding water evaporation is to disperse on the water surface a fatty alcohol as is shown by Russell G. Dressler in "The Suspension Process for Reservoir Evaporation Control," Industrial and Engineering Chemistry, vol. 56, No. 7, July 1964, pages 36 and 39. This method is a reasonable approach, since the fatty alcohol does retard the evaporation of water to a certain extent, however, it has one failure in that the fatty alcohol is consumed by microorganisms such as bacteria. A search for a better solution to the problem of conservation of water is continuing.

It is thus an object of the present invention to provide a method for retarding evaporation of water from aqueous bodies. Still another object is to provide a water evaporation retarder which is not as biodegradable as the fatty alcohols.

The present invention relates to a method for retarding water evaporation comprising dispersing on an aqueous surface, which is in contact with an atmosphere, an organosilicon compound selected from the group consisting of

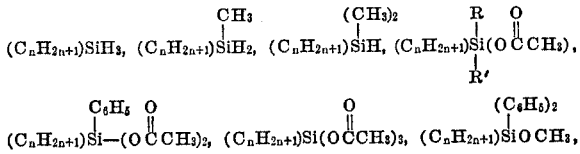

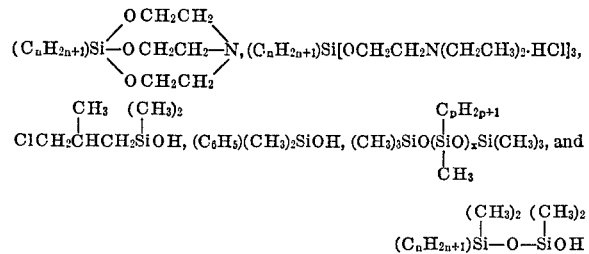

in which $n$ has a value of from 12 to 45 inclusive, $p$ has a value of from 10 to 14 inclusive, $x$ has an average value of from 30 to 40 inclusive and each R and R' is selected from the group consisting of methyl radicals and phenyl radicals.

The surface of an aqueous body is treated such that the defined organosilicon compounds are dispersed on the surface. Any suitable means of causing the aqueous surface to have a dispersion of the defined organosilicon compound can be used. The means for dispersing the defined organosilicon compounds can include, for example, spraying either a finely divided solid or liquid on the aqueous surface, forming an organic solvent solution of the defined organosilicon compounds wherein the organic solvent is a volatile organic solvent and then spraying, pouring or dispersing by pipes on the aqueous surface, applying an aqueous dispersion on the aqueous surface of the aqueous body, and the like.

The aqeous body can be a stationary or changing body. If the aqueous body is a changing aqueous body wherein the additions and removals of parts of the aqueous body are from the surface of the aqueous body, additional organosilicon compound should be added as required to maintain the desired amount on the surface. In some cases this would involve continuous addition of organosilicon compound. Thus, the evaporation of water can be retarded by dispersing and maintaining an evaporation retardant film of the organosilicon compound on the aqueous surface. Where the removals from a changing aqueous body do not effect the surface, additions are usually not required.

The organosilicon compounds useful as evaporation retardants in the present invention include those having long chain alkyl radicals attached to the silicon atom through silicon-carbon bonds. It is completely unexpected that these organosilicon compounds would retard the evaporation of water. What is even more unexpected is that not all organosilicon compounds having long chain alkyl radicals will retard water evaporation.

The organosilicon compounds useful as evaporation retardants include those having a formula $(C_nH_{2n+1})SiH_3$ wherein $n$ has a value of from 12 to 45, examples include $C_{14}H_{29}SiH_3$, $C_{12}H_{25}SiH_3$, $C_{16}H_{33}SiH_3$, $C_{19}H_{39}SiH_3$, $C_{18}H_{37}SiH_3$, $C_{20}H_{41}SiH_3$, $C_{21}H_{43}SiH_3$, $C_{30}H_{61}SiH_3$, $C_{42}H_{85}SiH_3$ and $C_{45}H_{91}SiH_3$, those having a formula

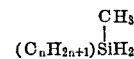

wherein $n$ is defined above, examples include,

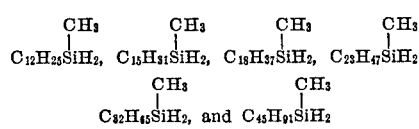

those having a formula

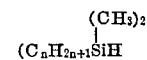

wherein $n$ is defined above, examples include,

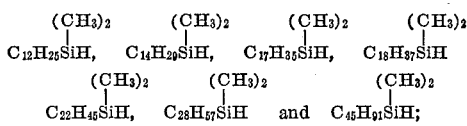

$C_{22}H_{45}\overset{(CH_3)_2}{Si}H$, $C_{28}H_{57}\overset{(CH_3)_2}{Si}H$ and $C_{45}H_{91}\overset{(CH_3)_2}{Si}H$;

those of a formula

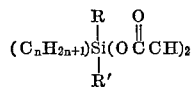

wherein $n$ is defined above and each R and R' is a methyl radical or a phenyl radical, examples include

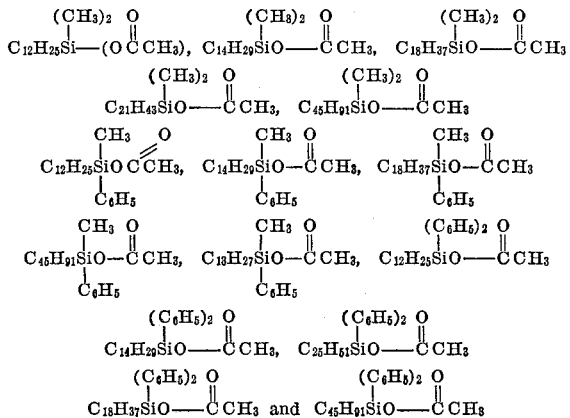

those of a formula

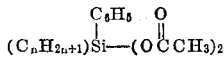

wherein $n$ is defined above, examples include

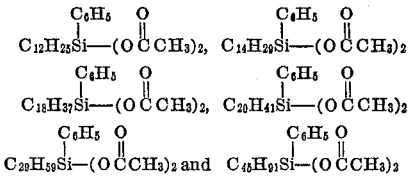

those of a formula

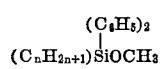

wherein $n$ is defined above, examples include

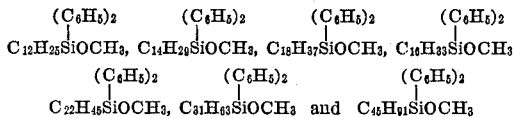

those of a formula

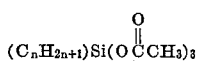

wherein $n$ is defined above, examples include

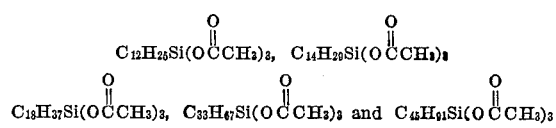

those of a formula

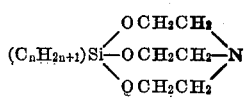

wherein $n$ is defined above, examples include

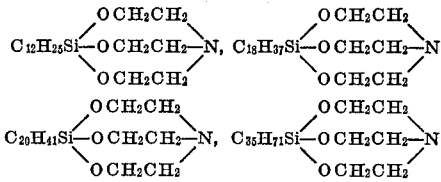

and

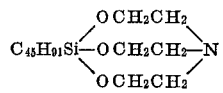

those of the formula $(C_nH_{2n+1})Si[OCH_2CH_2N_2(CH_2CH_3)_2 \cdot HCl]_3$ wherein $n$ is defined above, examples include
$C_{12}H_{25}Si[OCH_2CH_2N(CH_2CH_3)_2 \cdot HCl]_3$
$C_{18}H_{37}Si[OCH_2CH_2N(CH_2CH_3)_2 \cdot HCl]_3$
$C_{20}H_{41}Si[OCH_2CH_2N(CH_2CH_3)_2 \cdot HCl]_3$,
$C_{24}H_{49}Si[OCH_2CH_2N(CH_2CH_3)_2 \cdot HCl]_3$
and
$C_{45}H_{91}Si[OCH_2CH_2N(CH_2CH_3)_2 \cdot HCl]_3$ those of the formula

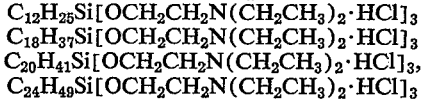

wherein $p$ is 10 to 14 inclusive and $x$ has an average value of 30 to 40 inclusive, examples include

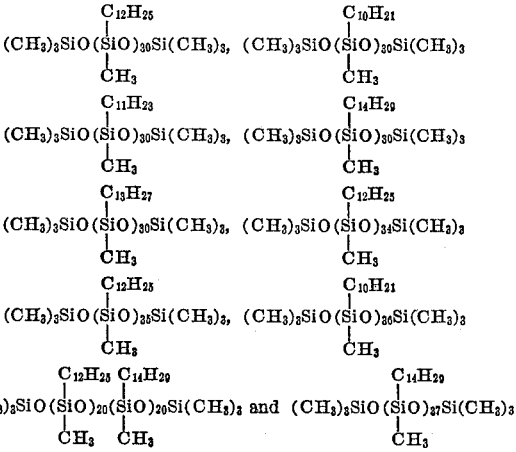

those of a formula

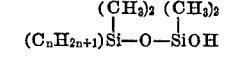

wherein $n$ is defined above, examples include

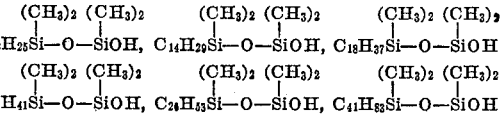

and

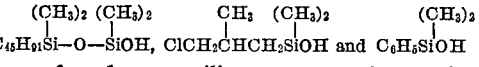

The preferred organosilicon compounds are those of the following formulae

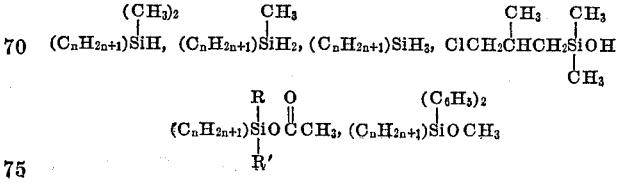

$(C_nH_{2n+1})Si[OCH_2CH_2N(CH_2CH_3)_2 \cdot HCl]_3$ and

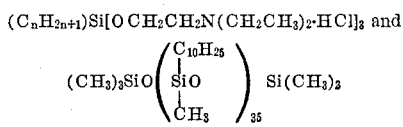

where $n$ is 18 to 45 inclusive and R and R' are defined above.

The organosilicon compounds can be applied to the aqueous body as single species or as mixtures of any two or more of the above defined organosilicon compounds.

The organosilicon compounds can be applied in any amount which is effective in retarding water evaporation. The evaporation of water can be retarded by spreading a thin film of the organosilicon compound on the aqueous surface. The film can be continuous or discontinuous depending on the desired results. It is preferred, however, that at least 0.001 g. be applied per square inch of aqueous surface. Usually not more than 0.010 g. per square inch of aqueous surface is applied for economical reasons since any greater amount does not substantially reduce the evaporation rate. Amounts greater than 0.010 g. per square inch of aqueous surface, of course, can be used, such as up to 1.0 g. per square inch of aqueous surface. The particular amount of organosilicon compound used will depend upon the conditions of the atmosphere and aqueous body and the particular results desired. Conditions such as temperature and movement of the atmosphere and/or aqueous body will be influential factors in the amount used.

The process of this invention is useful in retarding evaporation where a drying atmosphere is in contact with the surface of an aqueous body. The aqueous body can be in an open tank, a ditch, a trough, a pan, a kettle, a bowl, a barrel, a dish or a closed vessel with a drying atmosphere passing through it, or it can be a pond, a lake or a reservoir.

By varying the amount of organosilicon compound applied to the surface, the evaporation rate can be controlled. By controlling the evaporation rate, specific cooling effects can be accomplished which are due to the evaporation process. Thus, the present process can be used to control the temperature of an aqueous body under certain conditions.

The organosilicon compounds of the present invention are particularly useful since they are not consumed to any great extent by microorganisms. For all practical purposes, the organosilicon compounds can be considered non-biodegradable. Thus, replacements required by the disappearance of the evaporation retarder is very small compared to prior materials used, such as the fatty alcohols.

The evaporation retarders can best be prepared by the following methods. Compounds of the formula $$(C_nH_{2n+1})SiH_3$$

can best be prepared by reacting an appropriate α-olefin with $HSiCl_3$ in the presence of a platinum catalyst, such as chloroplatinic acid. The resulting product has a formula $(C_nH_{2n+1})SiCl_3$. This $(C_nH_{2n+1})SiCl_3$ is then mixed with lithium aluminum hydride to produce $$(C_nH_{2n+1})SiH_3$$

Compounds of the formula

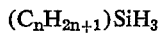

can best be prepared by reacting an α-olefin with $H(CH_3)SiCl_2$ in the presence of a platinum catalyst, such as chloroplatinic acid. The resulting product has a formula $(C_nH_{2n+1})(CH_3)SiCl_2$. The $(C_nH_{2n+1})(CH_3)SiCl_2$ is then mixed with lithium aluminum hydride to produce $(C_nH_{2n+1})(CH_3)SiH_2$.

Compounds of the formula $(C_nH_{2n+1})(CH_3)_2SiH$ can best be prepared by reacting an α-olefin with $$H(CH_3)_2SiCl$$

in the presence of a platinum catalyst, such as chloroplatinic acid. The resulting product has a formula $(C_nH_{2n+1})(CH_3)_2SiCl$. The $(C_nH_{2n+1})(CH_3)_2SiCl$ is then mixed with lithium aluminum hydride to produce $(C_nH_{2n+1})(CH_3)_2SiH$.

Compounds of the formula

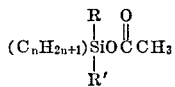

can best be prepared by reacting an α-olefin with $HRR'SiCl$ in the presence of a platinum catalyst, such as chloroplatinic acid. A compound of the formula

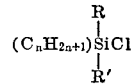

is obtained. This

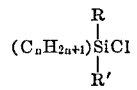

is then mixed with sodium acetate to produce

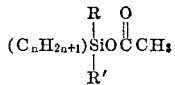

Another method of preparing compounds of the formula

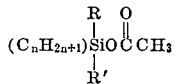

is to react the corresponding chlorosilane with acetic anhydride.

Compounds of the formula

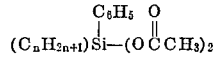

can best be prepared by reacting $H(C_6H_5)SiCl_2$ with an α-olefin in the presence of a platinum catalyst, such as coloroplatinic acid. A compound of the formula

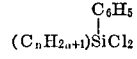

is obtained. The

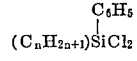

is then mixed with sodium acetate to produce

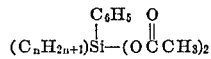

Another method of preparing compounds of the formula

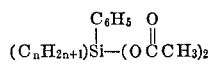

is to react the corresponding chlorosilane with acetic anhydride.

Compounds of the formula

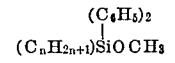

can best be prepared by reacting an α-olefin with $H(C_6H_5)_2SiCl$ in the presence of a platinum catalyst, such as chloroplatinic acid. The resulting product has a formula

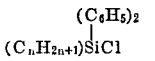

This

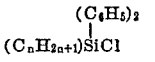

is then mixed with methanol to produce

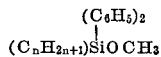

The best method of preparing (3-chloro-3-methylpropyl)dimethylsilanol is to mix (3-chloro-2-methylpropyl)dimethylchlorosilane with sodium bicarbonate in the absence of water. The mixture is filtered to remove the sodium chloride which is formed and to recover the (3-chloro-2-methylpropyl)dimethylsilanol. Carbon dioxide leaves the mixture as a gas. The (3-chloro-2-methylpropyl)dimethylchlorosilane can be prepared by the method described in "The Addition of Silicon Hydrides to Olefinic Double Bonds, Part V. The Addition to Allyl and Methallyl Chlorides," Journal of the American Chemical Society, volume 82, July 20, 1960, pages 3601 to 3604, by John W. Ryan, Gerald K. Menzie and John L. Speier.

Compounds of the formula

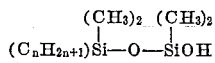

can best be prepared by reacting one mole of an α-olefin with one mole of $[H(CH_3)_2Si]_2O$ in the presence of a platinum catalyst, such as chloroplatinic acid. The resulting product is a mono-adduct of the formula

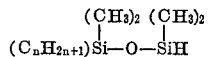

This mono-adduct can then be hydrolyzed by using water and a palladium on charcoal catalyst. The resulting product has a formula

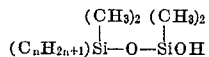

and can be recovered by distillation.

Compounds of the formula

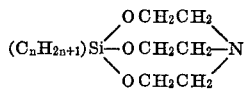

can best be prepared by the method described in U.S. Pat. No. 3,118,921. In the method of U.S. Pat. No. 3,118,921, an alkoxysilane is reacted with triethanolamine. The alkoxysilane used to obtain the

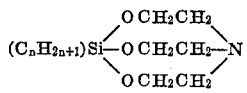

of the present invention has a formula

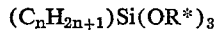

which can be prepared by reacting the appropriate α-olefin with $HSi(OR^*)_3$ in the presence of a platinum catalyst, such as chloroplatinic acid. The OR* is preferably methoxy or ethoxy. The alkoxysilane is mixed with triethanolamine and then heated whereby methanol or ethanol are evolved from the mixture and the product is formed.

Compounds of the formula

can best be prepared by the method described in U.S. Pat. No. 2,814,572. The chlorosilanes of the formula

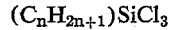

are reacted with $(CH_3CH_2)_2NCH_2CH_2OH$. The

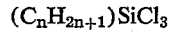

is prepared as described above.

Dimethylphenylsilanol is a known compound and can be prepared by the method described in Example 1 of U.S. Pat. No. 3,099,640.

Compounds of the formula

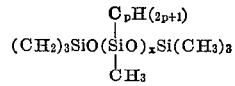

can best be prepared by reacting a siloxane of the formula

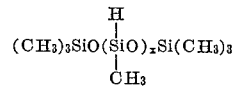

with the appropriate α-olefin in the presence of a platinum catalyst such as chloroplatinic acid according to the method as described in Great Britain patent specification No. 1,041,870.

The following examples are illustrative only and should not be construed as limiting the invention which is properly delineated in the appended claims.

EXAMPLE 1

A liter flask was charged with 252 g. of octadecene-1 and heated to 110° C. To the heated octadecene-1 was added 110 g. of dimethylmonochlorosilane and 0.15 cc. of chloroplatinic acid. The reaction was exothermic and the temperature rose to 128° C. and was held there for one-half hour. The excess dimethylmonochlorosilane was removed by heating the mixture. The product showed no silicon-bonded hydrogen atoms when an infrared spectra was obtained. The product obtained was

in a yield of 44.5 g.

A vapor phase chromatogram was run on the product and a small amount of octadecene-1 was still unreacted. The product was then heated to 120° C. and 50 g. of dimethylmonochlorosilane and 0.10 cc. of chloroplatinic acid was added. The reaction mixture was refluxed. The excess dimethylmonochlorosilane, which was 45 g. was removed.

A 250 ml. flask was charged with 150 cc. of acetic acid and 16.4 g. of sodium acetate. The mixture was stirred until the sodium acetate dissolved. At room temperature, 41.6 g. of the $(C_{18}H_{37})(CH_3)_2SiCl$ was added to the sodium acetate solution, resulting in a two-phase system. The mixture was then stirred and a white solution resulted. The mixture was stirred for 6 hours. The resulting product was

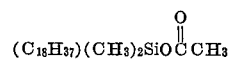

in a yield of 44.5 g.

A 4 weight percent solution of octadecyldimethylacetoxysilane in diethyl ether was prepared. On the surface of 100 g. of tap water in a 250 ml. stainless steel cup, 0.2 g. of the octadecyldimethylacetoxysilane solution was placed. The amount of octadecyldimethylacetoxysilane on the surface was 0.008 g. The surface area of the water exposed to the atmosphere was 5.9 square inches. Thus, the amount of octadecyldimethylacetoxysilane was 0.00136 g. per square inch of aqueous surface. The resulting assembly was placed in a controlled atmosphere of 65% relative humidity and 68° F. The weight of the cup, water and octadecyldimethylacetoxysilane solution was initially determined and then observed at time intervals of 1 day, 2 days, 5 days and 7 days. A control cup was also placed in the controlled atmosphere. The control was prepared as above, but without the octadecyldimethylacetoxysilane solution. A 4 weight percent diethyl ether solution of octadecyldimethylsilanol was used in place of the octadecyldimethylacetoxysilane. This was used as a comparison to show the unique properties of the

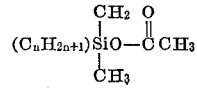

compounds.

The results below are the weight percentages of water lost in a given period under the test conditions.

| | Percent water loss after— | | | | Percent savings over control |
|---|---|---|---|---|---|
| | 1 day | 2 days | 5 days | 7 days | |
| (1) Control | 7.3 | 14.7 | 35.0 | 47.2 | |
| (2) 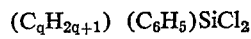 | 1.3 | 2.3 | 8.2 | 18.2 | 61.4 |
| (3) 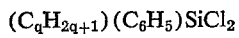 | 7.1 | 16.5 | 37.4 | 50.1 | −6.1 |

EXAMPLE 2

(A) A flask was charged with 242 g. of a mixture of α-olefins. The α-olefin mixture contained α-olefins having from 15 to 20 carbon atoms per molecule and the average molecular weight of the mixture was 242. To the mixture of α-olefins 159.3 g. of $(C_6H_5)HSiCl_2$ was added, the mixture being under a nitrogen atmosphere. The resulting mixture was heated to 120° C. and 0.1 ml. of chloroplatinic acid was added. The temperature of the reaction mixture was maintained between 120° C. and 140° C. for one hour. The resulting mixture was then stripped to 160° C. at about 1 mm. of Hg pressure to remove any unreacted materials. The product obtained was $$(C_qH_{2q+1})(C_6H_5)SiCl_2$$

where $q$ was 15 to 20 in a yield of 273.1 g.

In a 100 ml. flask, 8.6 g. of sodium acetate was dissolved in 55 cc. of acetic acid and then 24 g. of the $$(C_qH_{2q+1})(C_6H_5)SiCl_2$$

prepared above, was added. A white precipitate formed immediately. The mixture was stirred for 7 hours. A three phase system resulted. The top phase of the three phase system was the product phase. The bottom liquid phase was acetic acid and sodium acetate and the bottom solid phase was sodium chloride. The mixture was separated by filtering, decanting and the product phase was stripped to remove any impurities. The product was obtained in a yield of 10.7 g. and was

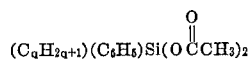

where $q$ was 15 to 20 inclusive. The melting point was 24° C.

(B) A 500 ml. flask was charged with 266 g. of the α-olefin mixture as described in (A) above, and was then heated to 125° C. To the heated mixture, 100 ml. of trichlorosilane and 0.25 ml. of chloroplatinic acid were added. The temperature was maintained between 100° C. to 150° C. for one hour. The resulting product was stripped at less than 1 mm. of Hg up to a pot temperature of 190° C. The resulting product was obtained in a yield of 297 g. and was $(C_qH_{2q+1})SiCl_3$ where $q$ was 15 to 20 inclusive.

In a 300 ml. flask, 25.8 g. of sodium acetate was added and then dissolved in 150 ml. of acetic acid. The solution was stirred and then 47.9 g. of the $(C_qH_{2q+1})SiCl_3$, prepared above, was added. The resulting mixture was stirred for 3 hours and then the product was separated as described above in (A). The product was obtained in a yield of 20.8 g. and was

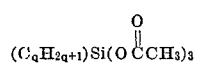

where $q$ was 15 to 20 inclusive. The product had a melting point of 47° C.

(C) A flask was charged with 700 g. of decene-1, 300 g. of

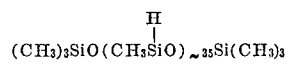

and 0.35 ml. of chloroplatinic acid. The mixture was cloudy at the beginning of the reaction, but became clear. The mixture showed some unreacted SiH and 35 g. of decene-1 was added. Most of the SiH then disappeared. The mixture was stripped to 140° C. at 3 mm. of Hg. The product remaining was

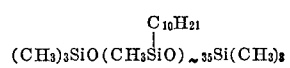

having a viscosity of 1105 cs. at 25° C.

(D) Ten weight percent solutions of the above products of (A), (B) and (C) in diethyl ether were prepared. The diethyl ether solutions were then tested as described in Example 1 above, except 0.02 g. of each of the products was used instead of 0.008 g.

The results below are the weight percentages of water lost in a given period under the test conditions.

| | Percent water loss after— | | | | Percent savings over control |
|---|---|---|---|---|---|
| | 1 day | 2 days | 5 days | 7 days | |
| (1) | 7.3 | 14.7 | 35.0 | 47.2 | |
| (2) $C_{15-20}H_{31-41}\overset{C_6H_5}{\underset{}{Si}}-(O\overset{O}{\underset{}{C}}CH_3)_2$ | 6.5 | 13.9 | 31.7 | 43.1 | 8.7 |
| (3) $C_{15-20}H_{31-41}Si(O\overset{O}{\underset{}{C}}CH_3)_3$ | 6.6 | 14.0 | 31.4 | 44.0 | 6.8 |
| (4) $(CH_3)_3SiO(CH_3\overset{C_{10}H_{21}}{\underset{}{Si}}O)_{\sim 35}Si(CH_3)_3$ | 4.7 | 9.8 | 23.3 | 33.9 | 28.2 |

EXAMPLE 3

(A) A flask was charged with 45.0 g. of octadecene-1 and two drops of chloroplatinic acid. The resulting mixture was stirred and heated to 125° C., then 28.0 g. of monoethylmonophenylmonochlorosilane was slowly added. The resulting mixture was stirred and then allowed to cool. The product obtained was

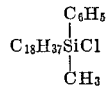

in a yield of 72 g.

To 36 g. of the octadecylmethylphenylchlorosilane was added 150 g. of a solution of 5 weight percent sodium acetate in acetic acid. This mixture was heated at 50° C. for 10 minutes. A white precipitate of sodium chloride formed and was removed by filtration. The remaining mixture was allowed to stand and it separated into two phases. The top phase was the product phase. The top phase was decanted and then stripped at 175° C. for one hour under reduced pressure. The product obtained was

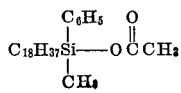

(B) A mixture of 28 g. of α-octadene and 5 drops of a one weight percent solution of platinum, as chloroplatinic acid, in isopropanol was warmed to 100° C. and then 21.8 g. of $H(C_6H_5)_2SiCl$ was dropped into it. The reaction was slow and the resulting mixture was maintained at about 100° C. for one day. After one day, 10 g. of additional α-octadene and 5 additional drops of the platinum solution was added. The resulting mixture was heated to 150° C. and then 5 more drops of the platinum solution was added. The resulting mixture was heated until only a trace of silicon-bonded hydrogen could be detected. The product was $C_{18}H_{37}(C_6H_5)_2SiCl$ and was recovered by removing the volatiles by distillation at reduced pressure.

(C) A portion of the $C_{18}H_{37}(C_6H_5)_2SiCl$ was dissolved in acetone and excess sodium acetate was added. The resulting mixture was agitated and then the sodium chloride and remaining sodium acetate were filtered from the solution. The solution was distilled to remove the acetone. The product was

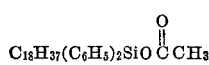

and had a refractive index, $n_D^{25}$ of 1.5104.

(D) Another portion of the $C_{18}H_{37}(C_6H_5)_2SiCl$ was mixed with methanol and allowed to stand for 64 hours. The remaining methanol was stripped from the reaction mixture and $C_{18}H_{37}(C_6H_5)_2SiOCH_3$ was obtained which had a refractive index, $n_D^{25}$ of 1.5151.

(E) The following ingredients were mixed and allowed to stand in a sealed container overnight, 10 g. of $$[H(CH_3)_2Si]_2O$$

12.6 g. of octadene-1 and 2 drops of a one weight percent solution of chloroplatinic acid in isopropanol. The resulting product was recovered by distillation (ca. 100° C.) and had a formula of

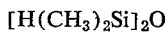

In a bottle, 7.6 g. of the

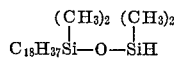

dioxane, a catalytic amount of palladium on charcoal and 0.35 g. of water was mixed and allowed to stand with occasional mixing. Hydrogen gas evolution began as soon as the ingredients were mixed. The solution was allowed to stand overnight. The solution was then filtered and distilled whereby the product of the formula

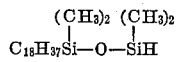

was obtained.

(F) Ten weight percent solutions of each of the products of (A), (C), (D) and (E) in diethyl ether were prepared. The diethyl ether solutions were then tested as described in Example 1 above, except 0.02 g. of each of the products was used instead of 0.008 g. The control was prepared as described in Example 1 and the following 10 weight percent diethyl ether solutions of octadecylmethylphenylchlorosilane, octadecyldiphenylisopropoxysilane and

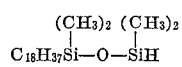

were used as comparisons to show the unique retarding properties of the compounds of the present method.

The results below are the weight percentages of water lost in a given period under the test conditions.

| | Percent water loss after— | | | | Percent savings over control |
|---|---|---|---|---|---|
| | 1 day | 2 days | 5 days | 7 days | |
| (1) Control | 7.3 | 14.7 | 35.0 | 47.2 | |
| (2) $C_{18}H_{37}\underset{CH_3}{\overset{C_6H_5}{Si}}iO\overset{O}{\overset{\|}{C}}CH_3$ | | 4.9 | 18.8 | 29.4 | 37.7 |
| (3) $C_{18}H_{37}\underset{C_6H_5}{\overset{C_6H_5}{Si}}iO\overset{O}{\overset{\|}{C}}CH_3$ | | 6.7 | 25.8 | 39.2 | 16.9 |
| (4) $C_{18}H_{37}\underset{C_6H_5}{\overset{C_6H_5}{Si}}iOCH_3$ | 5.4 | 12.1 | 27.2 | 40.7 | 13.7 |
| (5) $C_{18}H_{37}\underset{CH_3}{\overset{CH_3}{Si}}i-O-\underset{CH_3}{\overset{CH_3}{Si}}iOH$ | 4.5 | 10.4 | 31.7 | 44.1 | 6.6 |
| (6) $C_{18}H_{37}\underset{CH_3}{\overset{C_6H_5}{Si}}iCl$ | 12.5 | 26.7 | 57.0 | 74.0 | −56.8 |
| (7) $C_{18}H_{37}\underset{C_6H_5}{\overset{C_6H_5}{Si}}iOCH(CH_3)_2$ | 6.9 | 15.5 | 35.9 | 52.4 | −11.0 |
| (8) $C_{18}H_{37}\underset{CH_3}{\overset{CH_3}{Si}}i-O-\underset{CH_3}{\overset{CH_3}{Si}}iH$ | 8.9 | 17.3 | 44.9 | 65.1 | −37.9 |

EXAMPLE 4

(A) Sodium bicarbonate was mixed with a smaller amount of (3 - chloro-2-methylpropyl)dimethylchlorosilane. Sodium bicarbonate was added to the mixture until no further sodium chloride formed. The mixture foamed during the escape of the carbon dioxide. The mixture was filtered to remove the sodium chloride and any unreacted sodium bicarbonate and the remaining clear liquid was (3-chloro-2-methylpropyl)dimethylsilanol.

(B) A mixture of 1.5 g. of LiAlH₄ in tetrahydrofuran was made by slowly adding the LiAlH₄ to the tetrahydrofuran in a laboratory set up which was then closed with a stirrer and dropping funnel. The system was purged with nitrogen gas. The nitrogen purge was maintained during the reaction. To the tetrahydrofuran-LiAlH₄ mixture, 14.7 g. of $C_{18}H_{37}SiCl_3$ was added slowly from the dropping funnel. Some tetrahydrofuran was used to rinse

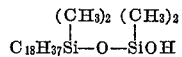

the dropping funnnel near the end of the addition of the $C_{18}H_{37}SiCl_3$. The reaction flask was cooled with a water bath as it became warm during the addition. After completion of the addition of the $C_{18}H_{37}SiCl_3$, the flask was allowed to cool. The resulting mixture was then filtered to remove some solid particles and then water was slowly added to the mixture causing warming of the mixture and an evolution of hydrogen. Two phases were present and the bottom phase was washed three times with diethyl ether and the extracts were combined with the top phase, the product phase. The product phase was washed three times with water. The water was discarded and the ether solution was dried over calcium sulfate. The calcium sulfate was filtered from the solution and the ether was evaporated. The remaining product was $C_{18}H_{37}SiH_3$ in a 80% yield.

(C) A mixture of 9.5 g. of $H(CH_3)_2SiCl$ and 25.3 g. of octadecene-1 was placed in a bottle and 3 drops of a one weight percent platinum as chloroplatinic acid in isopropanol was added. The resulting mixture was placed in a 110° C. oven overnight and then allowed to stand for two weeks. The mixture was then distilled and

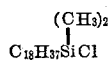

was obtained.

A solution of 2.07 g. of the octadecyldimethylchlorosilane in tetrahydrofuran was prepared. To a mixture of 0.65 g. of $LiAlH_4$ in tetrahydrofuran, the octadecyldimethylchlorosilane was added. After the evolution of gas stopped, the mixture was filtered and the filtrate was allowed to stand over the weekend in a hood to evaporate the solvent. The product was

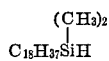

(D) Mixed 11.5 g. of $H(CH_3)SiCl_2$, 23.3 g. of octadecene-1 and 2 drops of one weight percent platinum as chloroplatinic acid in isopropanol in a two ounce bottle. The bottle was capped and placed in a 110° C. oven overnight. The resulting mixture was distilled and

was obtained as the product.

Dissolved 3.5 g. of the octadecylmethyldichlorosilane in tetrahydrofuran. Added 0.2 g. of $LiAlH_4$ to tetrahydrofuran and then added the octadecylmethyldichlorosilane solution to it. After the evolution of gas stopped, the mixture was filtered and the solvent evaporated from the filtrate. The product was a white solid of the formula

(E) Ten weight percent of the following in diethyl ether were prepared.

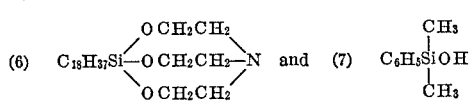

The above diethyl ether solutions were then tested as described in Example 1 above, except 0.02 g. of each of the products was used instead of 0.008 g. The control was prepared as described in Example 1.

The results below are the weight percentages of water lost in a given period under the test conditions.

|  | Percent water loss after— | | | | Percent savings over control |
|---|---|---|---|---|---|
|  | 1 day | 2 days | 5 days | 7 days |  |
| (1) Control | 7.3 | 14.7 | 35.0 | 47.2 |  |
| (2) $ClCH_2\overset{CH_3}{\underset{CH_3}{C}}HCH_2\overset{CH_3}{\underset{}{S}}iOH$ | 4.0 | 8.0 | 19.0 | 26.5 | 43.9 |
| (3) $C_{18}H_{37}SiH_3$ | 3.0 | 4.5 | 7.5 | 10.5 | 77.8 |
| (4) $C_{18}H_{37}\overset{CH_3}{\underset{CH_3}{S}}iH$ | 4.5 | 8.5 | 19.5 | 31.5 | 33.3 |
| (5) $C_{18}H_{37}\overset{CH_3}{\underset{}{S}}iH_2$ | 4.0 | 7.5 | 16.0 | 26.0 | 44.9 |
| (6) $C_{18}H_{37}Si[OCH_2CH_2N(CH_2CH_3)_2·HCl]_3$ | 6.5 | 13.0 | 30.5 | 39.0 | 17.4 |
| (7) $C_{18}H_{37}Si{\overset{OCH_2CH_2}{\underset{OCH_2CH_2}{-OCH_2CH_2-}}}N$ | 6.5 | 14.0 | 34.5 | 43.0 | 8.9 |
| (8) $C_6H_5\overset{CH_3}{\underset{CH_3}{S}}iOH$ | 6.5 | 14.0 | 33.0 | 42.0 | 11.0 |

EXAMPLE 5

The evaporation of water from a storage tank is retarded when any one of the organosilicon compounds defined in the table of Example 4 substantially covers the aqueous surface.

EXAMPLE 6

(A) A mixture of 19.6 g. tetradecene-1, 13.6 g. $HSiCl_3$ and 2 drops of a one weight percent platinum, as chloroplatinic acid in isopropanol was placed in a bottle and sealed. This mixture was placed in a 120° C. oven overnight. The mixture was then distilled and $C_{14}H_{29}SiCl_3$ was obtained.

Mixed 0.25 g. of $LiAlH_4$ in tetrahydrofuran and dissolved 2.66 g. of $C_{14}H_{29}SiCl_3$ in tetrahydrofuran. Slowly added the silane solution to the $LiAlH_4$ mixture with stirring. After the foaming stopped, the mixture was filtered and the tetrahydrofuran was allowed to evaporate. The remaining residue had two phases, the solid phase was dissolved in water and the organic portion was dissolved in diethyl ether. The ether and water phases were separated and the water phase was washed twice with ether. The ether solutions were combined and the ether allowed to evaporate. The resulting product was $C_{14}H_{29}SiH_3$.

(B) A mixture of 19.6 g. of tetradecene-1, 9.4 g. of $H(CH_3)_2SiCl$ and 3 drops of a solution of a one weight percent platinum as chloroplatinic acid in isopropanol was placed in a small bottle and then allowed to stand in a 120° C. oven overnight. The resulting mixture was distilled and the product collected was

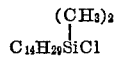

To a mixture of 0.2 g. of $LiAlH_4$ in tetrahydrofuran, 5.8 g. of the tetradecyldimethylchlorosilane in tetrahydrofuran was added. After the evolution of gas stopped the mixture was filtered and the tetrahydrofuran was evaporated, leaving

as the product (C) A solution of mixed alkyltrichlorosilanes having alkyl groups ranging from $C_{20}H_{41}-$ to $C_{42}H_{85}-$ in tetrahydrofuran was mixed with $LiAlH_4$. The reaction mixture was filtered to remove any excess $LiAlH_4$ and LiCl—$AlCl_3$ and then the solvent was evaporated. The alkyltrichlorosilane was prepared by mixing a mixture of α-olefins having 20 to 42 carbon atoms with $HSiCl_3$ in the presence of chloroplatinic acid. The alkylsilanes obtained were a mixture having the formula $(C_nH_{2n+1})SiH$ where $n$ was 20 to 42.

(D) Ten weight percent solutions of the products of (A), (B) and (C) in diethyl ether were prepared. The diethyl ether solutions were then tested as described in Example 1 above, except 0.02 g. of each of the products were used instead of 0.008 g. The control was prepared as described in Example 1.

The results below are the weight percentages of water lost in a given period under the test conditions.

| Compound | Percent water loss after— | | | | Percent savings over control |
|---|---|---|---|---|---|
| | 1 day | 2 days | 5 days | 7 days | |
| (1) Control | 7.3 | 14.7 | 35.0 | 47.2 | |
| (2) $C_{14}H_{29}SiH_3$ | 5.0 | 10.0 | 19.0 | 25.5 | 46.0 |
| (3) $C_{14}H_{29}\underset{CH_3}{\overset{CH_3}{\underset{|}{\overset{|}{Si}}}}iH$ | 4.5 | 10.0 | 15.0 | 25.5 | 46.0 |
| (4) $C_{20-42}H_{41-85}SiH_3$ | 5.0 | 7.0 | 10.0 | 14.0 | 70.4 |

EXAMPLE 7

The diethyl ether solution of $C_{18}H_{37}SiH_3$ as described in Example 4 was used in an extended test. The atmosphere and testing were the same as described in Example 1. The following results were obtained:

| | Percent water loss after— | | |
|---|---|---|---|
| | 14 days | 21 days | 28 days |
| (1) Control | 74.2 | 100 | 100 |
| (2) $C_{18}H_{37}SiH_3$ | 24.5 | 39.0 | 57.0 |

EXAMPLE 8

When any one of the following compounds are dispersed on the surface of a water reservoir by spraying in an amount of 0.01 g. of the compound per square inch of water surface, the evaporation of the water is retarded.

(a)
$$C_{45}H_{91}\underset{CH_3}{\overset{CH_3}{\underset{|}{\overset{|}{Si}}}}-O-\underset{CH_3}{\overset{CH_3}{\underset{|}{\overset{|}{Si}}}}OH$$

(b)
$$(CH_3)_3SiO(\underset{CH_3}{\overset{C_{12}H_{25}}{\underset{|}{\overset{|}{Si}}}}O)_{30}Si(CH_3)_3$$

(c) $C_{24}H_{49}Si[OCH_2CH_2N(CH_2CH_3)_2 \cdot HCl]_3$ (d)
$$C_{12}H_{25}Si\underset{\diagdown OCH_2CH_2}{\overset{\diagup OCH_2CH_2}{-OCH_2CH_2-}}N$$

(e)
$$CH_3(CH_2)_{32}Si(O\overset{O}{\overset{\|}{C}}CH_3)_3$$

(f)
$$CH_3(CH_2)_{10}\underset{}{\overset{CH_2CH_3}{\underset{|}{C}}}H(CH_2)_7\underset{CH_3}{\overset{CH_3}{\underset{|}{\overset{|}{Si}}}}O-\overset{O}{\overset{\|}{C}}CH_3$$

(g)
$$C_{12}H_{25}\underset{C_6H_5}{\overset{C_6H_5}{\underset{|}{\overset{|}{Si}}}}OCH_3$$

(h)
$$C_{16}H_{33}\underset{CH_3}{\overset{CH_3}{\underset{|}{\overset{|}{Si}}}}iH$$

(i)
$$CH_3(CH_2)_{19}\underset{CH_3}{\overset{CH_3}{\underset{|}{\overset{|}{Si}}}}iH$$

(j) $CH_3(CH_2)_{44}SiH_3$ (k)
$$C_{12}H_{25}\overset{C_6H_5}{\underset{|}{Si}}-(O\overset{O}{\overset{\|}{C}}CH_3)_2$$

(l)
$$CH_3(CH_2)_{28}\overset{C_6H_5}{\underset{|}{Si}}-(O\overset{O}{\overset{\|}{C}}CH_3)_2$$

(m)
$$C_{14}H_{29}\underset{C_6H_5}{\overset{CH_3}{\underset{|}{\overset{|}{Si}}}}-O\overset{O}{\overset{\|}{C}}CH_3$$

(n)
$$CH_3(CH_2)_{12}\underset{CH_3}{\overset{C_6H_5}{\underset{|}{\overset{|}{Si}}}}-O\overset{O}{\overset{\|}{C}}CH_3$$

(o)
$$C_{31}H_{63}\underset{C_6H_5}{\overset{C_6H_5}{\underset{|}{\overset{|}{Si}}}}OCH_3$$

(p)
$$(CH_3)_3SiO(\underset{CH_3}{\overset{(CH_2)_9CH_3}{\underset{|}{\overset{|}{Si}}}}O)_{40}Si(CH_3)_3$$

(q) 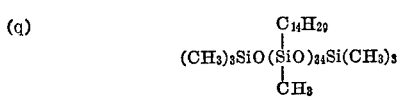

(r) $CH_3(CH_2)_{11}SiH_3$ (s) a mixture of

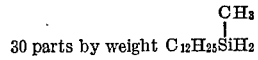

30 parts by weight $C_{16}H_{33}SiH_3$ 30 parts by weight $C_{12}H_{25}\underset{CH_3}{\overset{CH_3}{Si}}H_2$ 40 parts by weight $C_{45}H_{91}\underset{CH_3}{\overset{CH_3}{Si}}H$ (t) a mixture of 20 parts by weight $CH_3CH_2)_{11}\underset{CH_3}{\overset{CH_3}{Si}}O-\overset{O}{\underset{}{C}}CH_3$ 10 parts by weight $CH_3(CH_2)_{11}\underset{C_6H_5}{\overset{CH_3}{Si}}O-\overset{O}{\underset{}{C}}CH_3$ 70 parts by weight $CH_3(CH_2)_{11}\underset{C_6H_5}{\overset{C_6H_5}{Si}}O-\overset{O}{\underset{}{C}}CH_3$ (u) a mixture of 50 parts by weight $C_{12}H_{25}\underset{CH_3}{\overset{CH_3}{Si}}O-\underset{CH_3}{\overset{CH_3}{Si}}OH$ 50 parts by weight $C_{45}H_{91}Si\begin{array}{l}-OCH_2CH_2\\-OCH_2CH_2-N\\-OCH_2CH_2\end{array}$ (v) a mixture of 20 parts by weight $C_{45}H_{91}\underset{CH_3}{\overset{CH_3}{Si}}H_2$ 20 parts by weight $C_{12}H_{25}\underset{CH_3}{\overset{CH_3}{Si}}H$ 20 parts by weight $C_{20}H_{41}SiH_3$ 20 parts by weight $C_{30}H_{61}\overset{CH_3}{Si}H_2$ 20 parts by weight $C_{25}H_{51}\overset{CH_3}{Si}H_2$ (w) a mixture of 30 parts by weight $C_{45}H_{91}\underset{C_6H_5}{\overset{C_6H_5}{Si}}OCH_3$ 30 parts by weight $C_{45}H_{91}Si(O\overset{O}{\underset{}{C}}CH_3)_3$ 30 parts by weight $C_{45}H_{91}\underset{}{\overset{C_6H_5}{Si}}-(O\overset{O}{\underset{}{C}}CH_3)_2$

EXAMPLE 9

When 1.0 g. per square inch of pond surface of $CH_3(CH_2)_{15}SiH_3$ is sprayed on the surface of a pond, the evaporation of the water from the pond is reduced.

EXAMPLE 10

When 22.1 g. of $CH_3(CH_2)_{17}SiH_3$ is evenly dispersed on the surface of a cylindrical tank having a diameter of 20 feet containing an aqueous solution, the evaporation of the water is retarded and the cooling of the aqueous solution due to evaporation is less.

EXAMPLE 11

When any one of the following compounds are dispersed on the surface of a pond in an amount of 0.1 g. per square inch, the amount of water lost by evaporation is reduced.

(a) $CH_3(CH_2)_{11}Si(O\overset{O}{\underset{}{C}}CH_3)_3$ (b) $CH_3(CH_2)_{44}Si[OCH_2CH_2N(CH_2CH_3)_2\cdot HCl]_2$ (c) $CH_3(CH_2)_{44}\underset{CH_3}{\overset{CH_3}{Si}}O-\overset{O}{\underset{}{C}}CH_3$ (d) $CH_3(CH_2)_{44}\underset{C_6H_5}{\overset{CH_3}{Si}}O-\overset{O}{\underset{}{C}}CH_3$ (e) $CH_3(CH_2)_{11}Si[OCH_2CH_2N(CH_2CH_3)_2\cdot HC.]_3$ That which is claimed is:

1. A method for retarding water evaporation comprising dispersing on an aqueous surface, which is in contact with an atmosphere, an organosilicon compound selected from the group consisting of, $(C_nH_{2n+1})SiH_3$, $(C_nH_{2n+1})\overset{CH_3}{Si}H_2$, $(C_nH_{2n+1})\overset{(CH_3)_2}{Si}H$ $(C_nH_{2n+1})\underset{R'}{\overset{R}{Si}}O\overset{O}{\underset{}{C}}CH_3$, $(C_nH_{2n+1})Si-(O\overset{O}{\underset{}{C}}CH_3)_2$, $(C_nH_{2n+1})Si(O\overset{O}{\underset{}{C}}CH_3)_3$ $(C_nH_{2n+1})\overset{(C_6H_5)_2}{Si}OCH_3$, $(C_nH_{2n+1})Si\begin{array}{l}-OCH_2CH_2\\-OCH_2CH_2-N\\-OCH_2CH_2\end{array}$ $(C_nH_{2n+1})Si[OCH_2CH_2N(CH_2CH_3)_2\cdot HCl]_3$, $ClCH_2\underset{}{\overset{CH_3}{CH}}\overset{(CH_3)_2}{CH_2SiOH}$ $(C_6H_5)(CH_3)_2SiOH$, $(CH_3)_3SiO(\underset{CH_3}{\overset{C_pH_{2p+1}}{Si}}O)_xSi(CH_3)_3$ and $(C_nH_{2n+2})\overset{(CH_3)_2}{Si}-O-\overset{(CH_3)_2}{Si}OH$ in which $n$ has a value of from 12 to 45 inclusive,
$p$ has a value of from 10 to 14 inclusive,
$x$ has an average value of from 30 to 40 inclusive and each R and R' is selected from the group consisting of methyl radicals and phenyl radicals.

2. The method according to claim 1 in which the amount of organosilicon compound per square inch of aqueous surface is at least 0.001 gram.

3. The method according to claim 1 in which the organosilicon compound substantially covers the aqueous surface.

4. The method according to claim 1 in which a continuous film is dispersed on the aqueous surface.

5. The method according to claim 1 in which a thin film of the organosilicon compound is spread on the aqueous surface.

6. The method according to claim 1 in which the amount of organosilicon compound per square inch of aqueous surface is from 0.001 to 1.0 inclusive grams.

7. The method according to claim 1 in which the organosilicon compound is $ClCH_2\overset{CH_3}{\underset{}{CH}}CH_2\overset{(CH_3)_2}{SiOH}$ 8. The method according to claim 1 in which the organosilicon compound is $(C_6H_5)(CH_3)_2SiOH$.

9. The method according to claim 1 in which the evaporation of the water is retarded by dispersing and maintaining an evaporation retardant film of the organosilicon compound on the aqueous surface.

10. The method according to claim 9 in which the amount of organosilicon compound per square inch of aqueous surface is maintained within the limits of 0.001 to 1.0 grams.

11. The method according to claim 1 which the organosilicon compound is in an organic solvent for the organosilicon compound.

12. The method according to claim 11 in which the organic solvent is a volatile organic solvent.

13. The method according to claim 1 in which the organosilicon compound has a formula

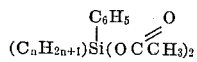

14. The method according to claim 13 in which $n$ has a value of from 15 to 20 inclusive.

15. The method according to claim 1 in which the organosilicon compound has a formula

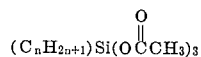

16. The method according to claim 15 in which $n$ has a value of from 15 to 20 inclusive.

17. The method according to claim 1 in which the organosilicon compound has a formula

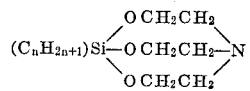

18. The method according to claim 17 in which $n$ is 18.

19. The method according to claim 1 in which the organosilicon compound has a formula

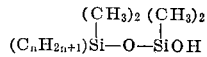

20. The method according to claim 19 in which $n$ is 18.

21. The method according to claim 1 in which the organosilicon compound has a formula

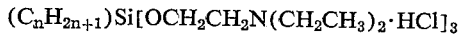

22. The method according to claim 21 in which $n$ has a value of from 18 to 45 inclusive.

23. The method according to claim 21 in which $n$ is 18.

24. The method according to claim 1 in which the organosilicon compound has a formula

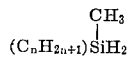

25. The method according to claim 24 in which $n$ has a value of from 18 to 45 inclusive.

26. The method according to claim 25 in which $n$ is 18.

27. The method according to claim 1 in which the organosilicon compound has a formula

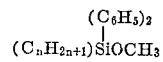

28. The method according to claim 27 in which $n$ has a value of from 18 to 45 inclusive.

29. The method according to claim 28 in which $n$ is 18.

30. The method according to claim 1 in which the organosilicon compound is

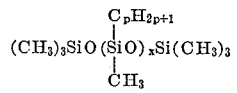

31. The method according to claim 30 in which $p$ is 10.

32. The method according to claim 31 in which $x$ is 35.

33. The method according to claim 1 in which the organosilicon compound has a formula

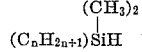

34. The method according to claim 33 in which $n$ is 14.

35. The method according to claim 33 in which $n$ has a value of from 18 to 48 inclusive.

36. The method according to claim 35 in which $n$ is 18.

37. The method according to claim 1 in which the organosilicon compound has a formula $(C_nH_{2n+1})SiH_3$.

38. The method according to claim 37 in which $n$ is 14.

39. The method according to claim 37 in which $n$ has a value of from 18 to 45 inclusive.

40. The method according to claim 39 in which $n$ has a value of from 20 to 42 inclusive.

41. The method according to claim 39 in which $n$ is 18.

42. The method according to claim 1 in which the organosilicon compound has a formula

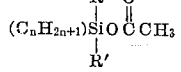

43. The method according to claim 42 in which both R and R' are methyl.

44. The method according to claim 43 in which $n$ has a value of from 18 to 45 inclusive.

45. The method according to claim 44 in which $n$ is 18.

46. The method according to claim 42 in which both R and R' are phenyl.

47. The method according to claim 46 in which $n$ has a value of from 18 to 45 inclusive.

48. The method according to claim 47 in which $n$ is 18.

49. The method according to claim 42 in which R is methyl and R' is phenyl.

50. The method according to claim 49 in which $n$ has a value of from 18 to 45 inclusive.

51. The method according to claim 50 in which $n$ is 18.

References Cited

UNITED STATES PATENTS

| | | | |
|---|---|---|---|
| 2,640,063 | 5/1953 | Kohl | 21—60.5 XR |
| 2,797,138 | 6/1957 | Veatch et al. | 21—60.5 |
| 2,797,139 | 6/1957 | Veatch | 21—60.5 |
| 3,095,263 | 6/1963 | Eckert et al. | 21—60.5 |
| 3,146,060 | 8/1964 | Canevari | 21—60.5 |
| 3,431,064 | 3/1969 | Fox | 21—60.5 |
| 3,450,488 | 6/1969 | Dressler | 21—60.5 |

MORRIS O. WOLK, Primary Examiner

B. S. RICHMAN, Assistant Examiner

U.S. Cl. X.R.

252—384